US011433316B1

(12) United States Patent
MacKay (10) Patent No.: US 11,433,316 B1
(45) Date of Patent: Sep. 6, 2022

(54) ARTIFICIAL HEARTBEAT GENERATOR DEVICE WITH AUTOMATIC CONTROL SYSTEM

(71) Applicant: James F. MacKay, Brimingham, MI (US)

(72) Inventor: James F. MacKay, Brimingham, MI (US)

(73) Assignee: Encompass Pet Group, LLC, Palmetto, FL (US)

( * ) Notice: Subject to any disclaimer, the term of this patent is extended or adjusted under 35 U.S.C. 154(b) by 0 days.

(21) Appl. No.: 17/653,171

(22) Filed: Mar. 2, 2022

Related U.S. Application Data

(60) Provisional application No. 63/155,347, filed on Mar. 2, 2021.

(51) Int. Cl.
*A63H 3/00* (2006.01)
*A01K 15/02* (2006.01)
*A63H 3/02* (2006.01)

(52) U.S. Cl.
CPC ........... *A63H 3/001* (2013.01); *A01K 15/025* (2013.01); *A63H 3/02* (2013.01)

(58) Field of Classification Search
CPC ......... A63H 3/001; A63H 3/02; A01K 15/025
USPC ............... 119/707, 71, 174, 28.5, 719, 72.5; 446/295
See application file for complete search history.

(56) References Cited

U.S. PATENT DOCUMENTS

| 2,757,480 | A | * | 8/1956 | Uchill | ..................... | A63H 3/28 446/295 |
| 2,859,731 | A | * | 11/1958 | Sutton | .................. | A01K 15/025 219/520 |
| 3,110,980 | A | * | 11/1963 | Moormann | ............ | A63H 3/001 446/295 |
| 3,298,132 | A | * | 1/1967 | Elwell | .................... | A63H 3/001 446/295 |

(Continued)

FOREIGN PATENT DOCUMENTS

CA 3030904 A1 * 7/2019 ........... A61B 5/0022

*Primary Examiner* — Yvonne R Abbott-Lewis
(74) *Attorney, Agent, or Firm* — Mark L. Maki; Miller Canfield (57) ABSTRACT

A heartbeat or pulse generator device is provided separately for use in or in combination with a comfort product such as a plush toy. The heartbeat generator device includes an automatic control system that provides for controlled operation of the heartbeat generator while compensating for natural movements during use. The heartbeat generator device contains a pulse generator to create the motion necessary to cause the heart to "beat" twice early in a beat interval. The heartbeat generator device to increase battery longevity by allowing the generator device to selectively shut off when it senses that the animal or other user is no longer interacting with the product. As the animal interacts, the emulated heartbeat continues. When the animal stops interacting for a period of time, the heartbeat will stop, and battery life is preserved. The heart will restart when motion is detected once again. Further, the improved device contains a sensor and control system that can sense physical movement of the heartbeat generator device while at the same time compensating for the physical movement it is itself creating with the motor to emulate a heartbeat.

20 Claims, 5 Drawing Sheets

(56) References Cited

U.S. PATENT DOCUMENTS

| | | | | |
|---|---|---|---|---|
| 3,563,229 | A * | 2/1971 | Petrusson | A61B 5/319 446/295 |
| 4,257,408 | A * | 3/1981 | Ramey | A63H 3/001 601/46 |
| 4,718,876 | A * | 1/1988 | Lee | A61M 21/00 601/78 |
| 4,742,799 | A * | 5/1988 | Schlitz | A01K 15/025 119/707 |
| 5,463,981 | A * | 11/1995 | Marcinko | A01K 9/00 119/71 |
| 5,865,771 | A * | 2/1999 | Shuto | A61H 23/0236 5/915 |
| 6,752,103 | B1 * | 6/2004 | Howell | A01K 9/00 119/71 |
| 6,939,195 | B1 * | 9/2005 | Hunt | A63H 3/001 446/295 |
| 6,968,806 | B2 * | 11/2005 | Helwig | A01K 1/0353 119/28.5 |
| 7,475,441 | B1 * | 1/2009 | Soberal | A47D 9/02 5/904 |
| 8,127,384 | B2 * | 3/2012 | Carlton | A47D 9/02 5/639 |
| 10,201,236 | B1 * | 2/2019 | Cloud | A47D 9/02 |
| 10,646,687 | B2 * | 5/2020 | Grainger | A47G 9/1036 |
| 10,785,956 | B1 * | 9/2020 | Richter | A01K 9/005 |
| 11,213,761 | B2 * | 1/2022 | Lyell | A63H 3/001 |
| 2002/0095103 | A1 * | 7/2002 | Blue | A61H 1/00 601/46 |
| 2007/0037474 | A1 * | 2/2007 | Lee | A63H 3/02 446/297 |
| 2007/0212974 | A1 * | 9/2007 | Brewer | A63H 9/00 446/295 |
| 2007/0227463 | A1 * | 10/2007 | Polito | A01K 1/0218 119/707 |
| 2013/0178982 | A1 * | 7/2013 | Wong | A63H 3/001 700/258 |
| 2014/0066692 | A1 * | 3/2014 | Monros | A61M 21/02 600/28 |
| 2016/0088818 | A1 * | 3/2016 | Thorne | A01K 27/008 119/707 |

* cited by examiner

ARTIFICIAL HEARTBEAT GENERATOR DEVICE WITH AUTOMATIC CONTROL SYSTEM

CROSS-REFERENCE TO RELATED APPLICATIONS

This application is a completion application of U.S. Provisional Application Ser. No. 63/155,347, filed Mar. 2, 2021, the entire disclosure of which is hereby incorporated by reference in its entirety.

FIELD OF THE INVENTION

The invention relates to an artificial heartbeat generator typically provided in plush toys to simulate a heartbeat and provide a calming effect to an animal such as a pet.

BACKGROUND OF THE INVENTION

Artificial heartbeat generators that physically pulse or "beat" are used in pet calming products to emulate another member of the pack. The heart is a heartbeat generator that is placed inside a plush toy and given to the pet. These products are particularly useful to counteract the effects of separation anxiety when an animal is removed from the litter. The animal instinctively desires to be near the artificial littermate and nudges, snuggles or lays on top of it. Known heartbeat generators can generate a steady, consistent pulse of heartbeats where each heartbeat can comprise a heartbeat pulse followed by a rest period before the next heartbeat pulse.

It is an object of the invention to provide an improved artificial heartbeat generator.

The present invention relates to an improved heartbeat or pulse generator device provided separately for use in or in combination with a comfort product such as a plush toy, wherein the heartbeat generator device includes an automatic control system that provides for controlled operation of the heartbeat generator while compensating for natural movements during use. The heartbeat generator device contains a motor and unbalanced weight to create the motion necessary to cause the heart to "beat" twice early in a beat interval that preferably is a one second interval. Claimed and disclosed herein is an improvement to the heartbeat generator device to increase battery longevity by allowing the generator device to selectively shut off when it senses that the animal or other user is no longer interacting with the product. As the animal interacts, the emulated heartbeat continues. When the animal stops interacting for a period of time, the heartbeat will stop, and battery life is preserved. The heart will restart when motion is detected once again.

Further, the improved device contains a sensor and control system that can sense physical movement of the heartbeat generator device while at the same time compensating for the physical movement it is itself creating with the motor to emulate a heartbeat. In particular, the heartbeat generator device can sense both the natural heartbeat pulses created by the generator device while sensing and compensating for additional vibrations or movements generated independently of the heartbeat generator device such as by animals or other users or other external influences.

In one embodiment, the sensor detects movement and vibrations by opening and closing a mechanical switch. When at rest, the switch remains closed. When movement occurs, the switch opens and generates a signal indicating movement of the product, whether cause by the heartbeat generator or by independent movements from external influences. When the heart is mechanically "beating", the signal from the sensor is extremely noisy. The noise tapers off during the rest portion of the beat but will not completely settle to a closed state. The control system automatically compensates for noise by dividing the beat time into the beat half and the rest half. The average level of noise is recorded for each half and compared to prior cycle averages. When the most recent levels are significantly greater than the average of prior beats, the system records a motion event and extends the overall time the heart will run. As a safety measure, if motion persists for an extended period of time the control system enters a fallback mode and will pause the beats and await motion before continuing.

Other objects and purposes of the invention, and variations thereof, will be apparent upon reading the following specification and inspecting the accompanying drawings.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Generally referring to the figures and the following disclosure, artificial hearts that physically pulse or "beat" are used in pet calming products to emulate another member of the pack, litter or household. The artificial hearts are particularly useful for young animals but are not so limited to young animals since the pet calming product may help with separation anxiety for any animal. The artificial heart is placed inside a plush toy or other comfort product and given to a pet. These products are particularly useful to counteract the effects of separation anxiety when an animal is removed from the litter. In use, the animal instinctively desires to be near the artificial littermate and nudges, snuggles or lays on top of it.

Figure 1:
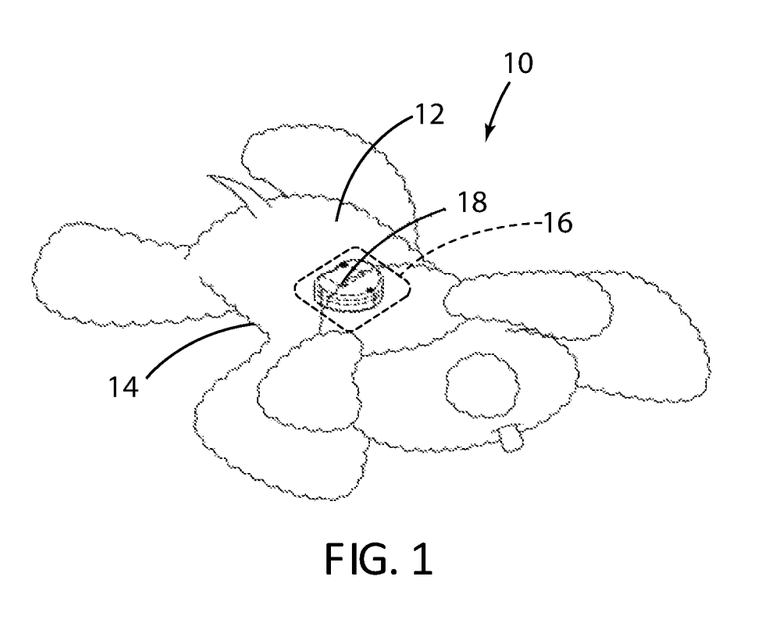
FIG. 1 is a perspective view of a heartbeat generator device positioned within a comfort product such as a plush toy formed in the anatomical shape of a dog.
Figure 3:
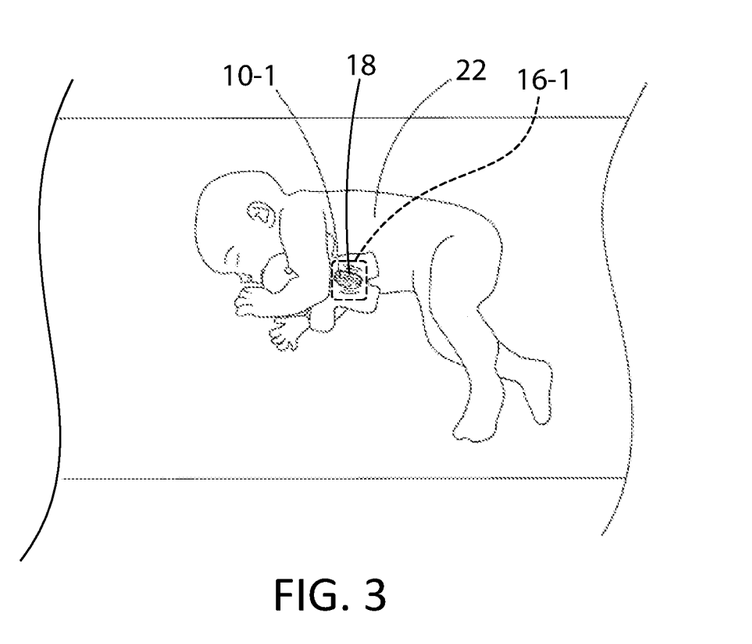
FIG. 3 shows a plush toy having an alternate shape in use with a young child.
Figure 4:
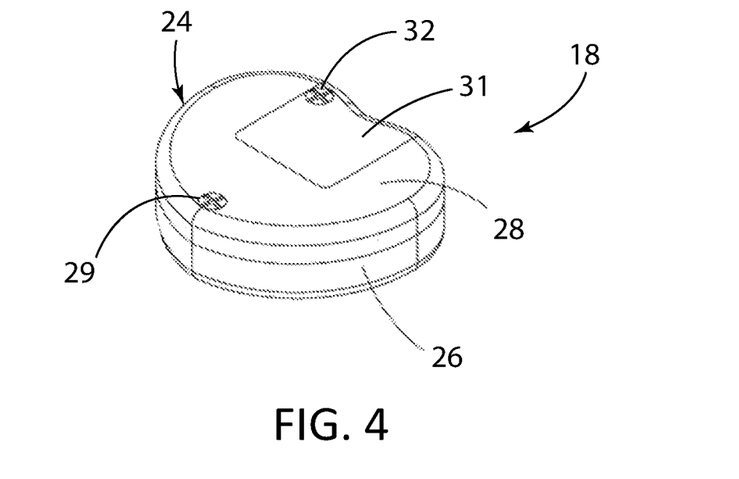
FIG. 4 is a perspective view of the heartbeat generator device from a rear side thereof.
Figure 5:
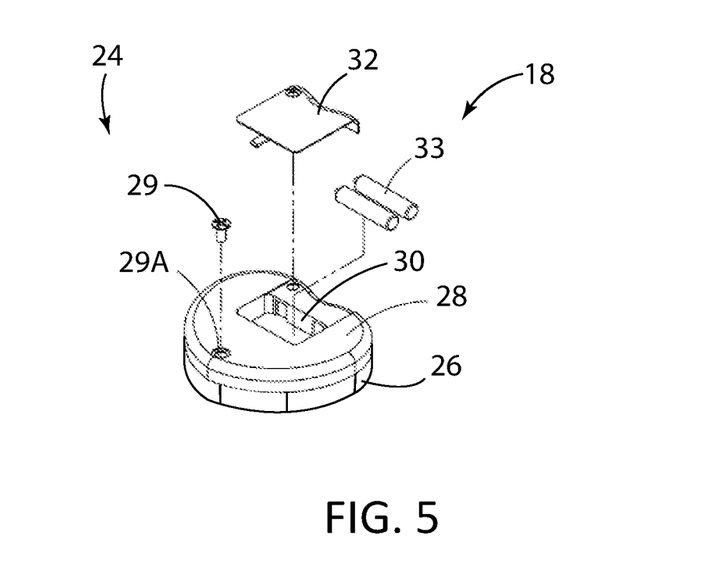
FIG. 5 is an exploded perspective view of the heartbeat generator device with a battery cover and batteries in a removed position.

In more detail, FIG. 1 illustrates a comfort product 10 preferably in the form of a stuffed or plush toy for use with animals such as household pets. The comfort product 10 may also be configured for use with other product users such as young infants. In the illustrated embodiment, the comfort product is provided with an anatomical form such as the form of a dog in FIG. 1. FIG. 1 illustrates a view of the back 12 of the animal lying on its belly. The anatomical form of the toy animal could be other than that of a dog, such as in the shape of a cat/kitten or other animal, or the comfort product 10 may be provided in a non-anatomical form such as a mattress or pillow that an animal to be calmed or soothed lies against. FIG. 3 shows a comfort product 10-1 in the anatomical shape of a small human-like baby.

In the embodiment shown, the comfort products 10 has an exterior surface 14 that is typically soft and forms an interior that is filled with a plush material such as a soft microfiber or like filler material. The filler material is selected to be soft, compliant, and adapted to form an inviting structure for the animal or other product user to rest against. Illustrative fillers would include the polymeric foam filler materials such as used in sleeping pillows. Preferably, the filler material is formed with an accessible pouch or chamber or cavity 16 as indicated in phantom outline in FIG. 1 in which a heartbeat generator device 18 may be inserted. Preferably, the exterior surface 14 is provided with an opening provides access into the accessible pouch 16, wherein a central opening may be formed on the bottom of the comfort product 10 and may have closures such as flaps secured by Velcro or other fasteners that are releasable to permit insertion of the heartbeat generator device 18 into the accessible pouch 16. This allows for insertion of the heartbeat generator device 18 into and out of the accessible pouch 16 such as during battery replacement. The closures are fastenable to secure the generator device 18 therein when the comfort product 10 is in use. While Velcro can serve as one type of fastener, other fasteners include straps, snaps and zippers.

Figure 2:
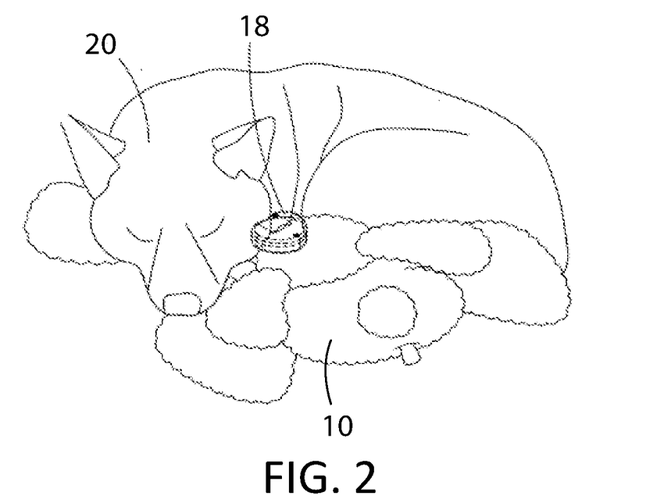
FIG. 2 shows the plush toy in use with a live animal.

Referring to FIGS. 1 and 2, the heartbeat generator device 18 serves as a vibratory or periodic pulse generator that is removably placed in the pouch 16. The heartbeat generator device 18 is adapted to generate rhythmic soothing acoustic sounds that simulate the heartbeat of a live being such as an animal 20. As seen in FIG. 2, the comfort product 10 may be provided to the animal 20 to emulate the heartbeat of another live being such as that of the animal's mother, littermate or even housemate, and to transmit the heartbeat pulses to the animal 20 when lying against the body of the comfort product 10. As seen in FIG. 3, the present invention is preferably used to comfort animals but may be used with infants 22, who also may be comforted by the feeling of a heartbeat in a comfort product, wherein the illustrated comfort product 10-1 has a more human form. In this alternate anatomical form, the heartbeat generator device 18 is still provided within an internal pouch 16-1. The heartbeat generator device 18 can also be stored within a mattress or pillow having a non-anatomical shape. Therefore, the present invention is directed to the heartbeat generator device 18 either by itself or as part of the comfort product 10 or 10-1 that may be provided in both anatomical and non-anatomical forms.

In more detail as to the heartbeat generator device 18, the heartbeat generator device 18 Has a main body 24, which may be in the shape of a heart, but is not limited to this specific shape. The appearance of the body 24 can be changed according to the user's preference or needs, and can be circular or rectangular or geometric or any other shape. The body 24 has an upper casing 26 and a lower casing 28, which may be fastened together such as a by a screw 29 or the like inserted into fastener bores 29A and 29B formed in the upper and lower casings 26 and 28. The lower casing 28 may be formed with a battery compartment 30 enclosed by a battery cover 31 that is removably held in place by a fastener 32 such as a screw, snap lock or the like. The battery compartment 30 includes one or more removable batteries 33 for powering the heartbeat generation system.

Figure 6:
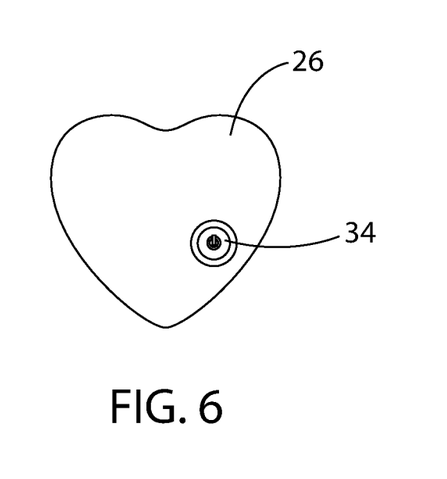
FIG. 6 is a plan view of a front side of the heartbeat generator device.
Figure 7:
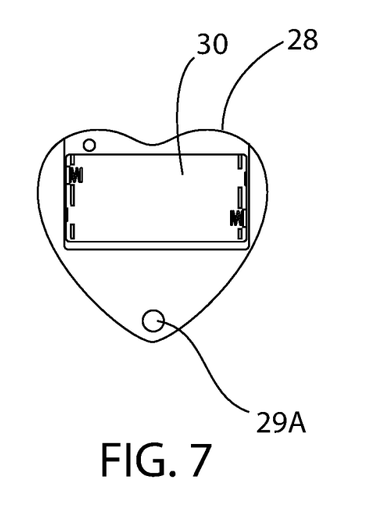
FIG. 7 is a rear view of the heartbeat generator device with a battery cover removed.
Figure 8:
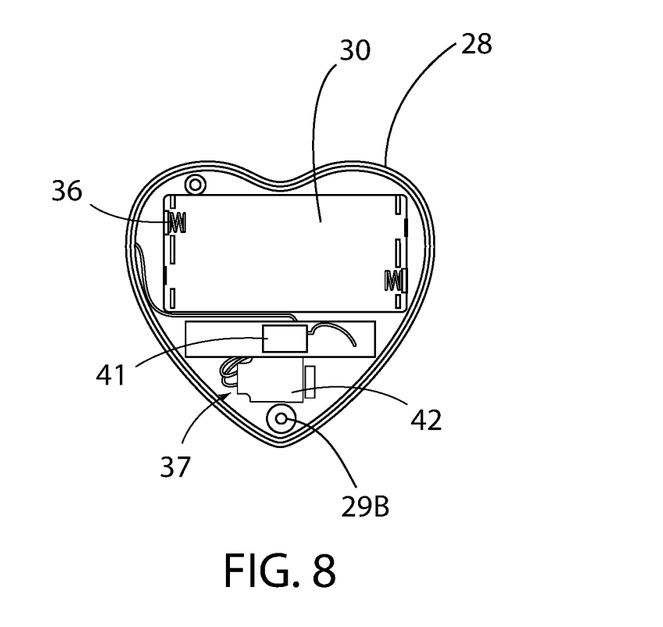
FIG. 8 shows the heartbeat generator device with a lower casing removed.

Referring to FIG. 6, the upper casing 26 may include a power or control button 34 for selectively activating and deactivating the heartbeat generator device 18. Referring to FIGS. 7 and 8, the upper casing 27 normally encloses or covers the interior side of the lower casing 28 but also is removable by removing the fastener 29 to expose the interior of the lower casing 28.

Figure 9:
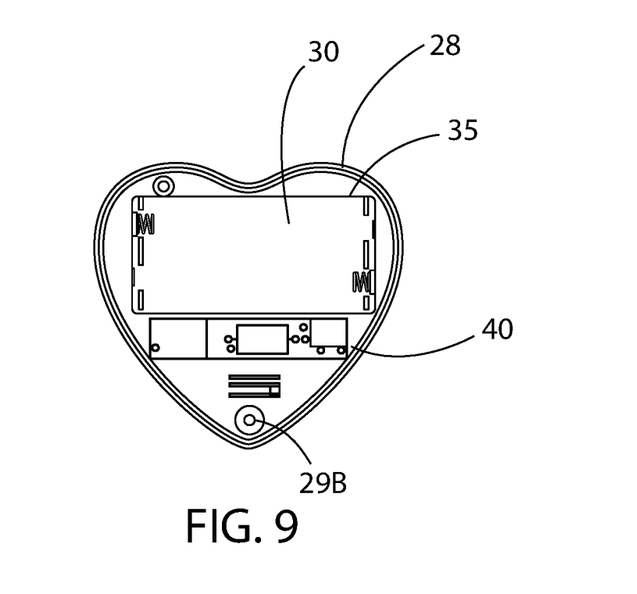
FIG. 9 shows the heartbeat generator device of FIG. 8 with a pulse generator removed therefrom for clarity of illustration.

As seen in FIGS. 8 and 9, the lower casing 28 is formed with the rectangular side walls 35 that form the battery compartment 30. The ends of the side walls 35 may include battery contacts 36 that electrically connect to a control module 37 mounted internally within the upper and lower casings 26 and 28. The control module 37 is thereby powered by through the battery contacts 36 and associated power conductors and activated by the control button 34, which also is operatively connected to the control module 37.

Referring to FIGS. 8 and 9, the control module 37 generally comprises a controller circuit 40, which interconnects to a sensor 41 for detecting motion or movement of the comfort product 10. The heartbeat generator device 18 further includes a pulse generator 42 comprising an intermittent motor and unbalanced weight to create the motion necessary to cause the heart to "beat" twice early in a defined beat interval mimicking a heartbeat such as a one second interval. A one second beat interval is a preferred frequency that comforts the emotions of the animal 20 or human 22, but the invention is not limited thereto. In use, the beat interval can be adjusted according to the user's needs, habits or preferences.

The beat interval comprises both an initial beat segment wherein the pulse generator 42 generates at least one and preferably two beat pulses like the vibration of a heartbeat, and a rest segment following the beat segment wherein the pulse generator 42 no longer generates the beat pulse. Notably, there may be some lower level vibrations during the rest segment in comparison to the beat segment and such vibrations need not reach zero during the rest segment. Rather, the invention encompasses the pattern wherein the beat segment generates higher vibration levels due to the pulse generator 42 in comparison to lower or zero vibration levels during the rest segment. The periodic vibrations from the pulse generator 42 during the beat segment and rest segment are detected by the sensor 41, which generates signals that are communicated to the controller circuit 40 for storage and analysis.

The controller circuit 40 is able to receive signals from the sensor 41 and store and analyze the signal data during operation. The sensor 41 also is able to detect external movements transmitted to the comfort product 10 such as external movements caused by an animal or other product user during normal use. These external movements detected by the sensor 41 may be pulses or vibratory movements but generally have a greater magnitude than the magnitude of the heartbeat pulses created by the pulse generator 42. Therefore, the sensor 41 detects a base level of internal movements from the periodic beat pulses from the pulse generator 42 through both the beat segment and rest segment during each beat interval and monitors the increases and decreases in magnitude of these internal or base movements during successive beat intervals. Where additional external movements are encountered through use or movement of the comfort product 10 by a user or other external influences, these additional external movements are also detected by the sensor 41 and reflected in the sensor signals transmitted to the controller circuit 40. Notably, these external movements are typically transitory and non-necessarily uniform during use. In comparison, the base, internal movements from the pulse generator 42 cycle higher and lower during the beat and rest segments and are relatively uniform and repetitive. That being said, these base and external movements are not necessarily precise due to the nature of the comfort product 10 or 10-1 and the sensor signals may contain significant noise or fluctuations in the signals.

The sensor 41 may have a variety of suitable configurations. In one embodiment, the sensor 41 may be a moving ball type sensor, which is commonly referenced as a SW-420 vibration sensor. This sensor 41 is a high sensitivity non-directional vibration sensor. In the preferred embodiment, when the control module 37 is stable, the sensor circuit is turned on and the output is high to generate a signal that indicates no or low movement. When movement or vibration occurs, the sensor 41 may turn to an off state so as to be briefly disconnected and output low to generate a signal that indicates movement.

In this embodiment, the sensor 41 thereby detects movement and vibrations by opening and closing a mechanical switch, which may be a ball switch as found in the type of sensor disclosed above. When at rest, the switch remains closed so that the high output signal indicates no or low movement. When movement occurs, the switch opens and the sensor 41 generates a signal indicating movement of the comfort product 10, whether such movement is caused by the heartbeat generator device 18 or independent movements from external influences on the comfort device 10.

The heartbeat generator device 18 is also configured to increase battery longevity by allowing the generator device 10 to selectively shut off when it senses that the animal or other user is no longer interacting with the comfort product 10. For example, as the animal interacts, the emulated heartbeat continues by repeating the beat interval successively through continued operation of the heartbeat generator device 18. In more detail, the controller circuit 40 continues to operate the pulse generator 42 so that the heartbeats continue in succession over time. The controller circuit 40 may continue this cycle for a predefined time period as measured by a timer or heartbeat cycle counter. During this operational state, if the sensor 41 transmits a signal that indicates that additional external movement is detected in addition to the heartbeat vibrations, the controller circuit 40 will register that the comfort product 10 is being moved by an animal or person. This is assumed to indicated that the user is still in need of comfort by the heartbeat vibrations so that the controller circuit 40 will continue operation of the pulse generator 42 such as by extending the predefined time period by an additional time period. The extended time period may be the same as the predefined time period or may be different than the initial predefined time period.

In the alternative, the controller circuit 40 may track the signals indicating external movements and the time between such movement signals, and if no such signals are received during a particular time period or a particular number of beat cycles, the controller circuit 40 may determine that the comfort product 10 is no longer in use or needed. This may occur if the product user, such as an animal, has departed from or stopped using the comfort device 10 or the user may have reached a comforted state such as sleep.

When the animal or other user stops interacting with the comfort device 10 for a period of time as indicated by the absence of external movements detected by the sensor 41, the controller circuit 40 will recognize the lack of movement over such period of time and then discontinue operation of the pulse generator 42 such that the pulse generator 42 will stop and battery life is preserved. However, the sensor 41 will be triggered by subsequent or restarted external product movements and signal the controller circuit 40 by a movement signal that causes the controller circuit 40 to restart the pulse generator 42. As such, the heartbeat generator device 18 will restart when motion is detected once again, and as noted, this preserves battery life.

The control module 37 also compensates for the combination of the internal movements generated by heartbeat vibrations and external movements caused by external influences during use. As disclosed above, the sensor 41 detects both internal movements and external movements to generate heartbeat signals and movement signals. Both the heartbeat signals and the movement signals generated by the sensor 41 can be relatively "noisy" or have signal fluctuations during actual use, but the inventive comfort device 10 is configured to compensate for such noise or signal fluctuations.

In this regard, when the heartbeat generator device 18 is mechanically "beating" or generating the vibratory pulse during the initial beat segment, the heartbeat signal from the sensor 41 is a relatively high signal that might exhibit significant noise or signal fluctuations. The noise or signal fluctuations typically taper off to a low signal during the rest portion of the beat interval so as to periodically cycle higher and lower during the beat and rest segments, but the heartbeat vibrations typically need not completely settle to a closed state in the time allotted before the next heartbeat pulse is generated by the heartbeat generator device 18.

The control system or module 37 automatically compensates for noise by dividing the total beat time or interval into the beat half or segment and the rest half or segment, and monitors the sensor signals during these segments of the total beat time interval. The average level of the beat signal or rest signal is calculated recorded for each half or segment, i.e., the beat segment and rest segment, and compared to prior cycle averages for these segments. This establishes baseline averages for the beat segment and rest segment and allows signal fluctuations or noise to be averaged out of the signal levels.

When the most recent movement levels are significantly greater than the average of prior beats as detected by the sensor 41, the system records a motion event and extends the overall time the heart will run as described above. As a safety measure, if motion persists for an extended period of time, the control module 37 of the control system enters a fallback mode and will pause the beats from the pulse generator 40 and await detection of additional motion before continuing.

As described above, the improved heartbeat generator device 18 contains a sensor and control system that can sense physical movement of the heart device 18 while at the same time compensating for the physical movement it is itself creating with the motor of the pulse generator 40 to emulate a heartbeat.

Although particular preferred embodiments of the invention have been disclosed in detail for illustrative purposes, it will be recognized that variations or modifications of the disclosed apparatus, including the rearrangement of parts, lie within the scope of the present invention.

What is claimed:

1. A heartbeat generator device for a comfort product, comprising:
a pulse generator for generating pulsed beats emulating a heartbeat during a beat interval, each said beat interval comprising an initial beat segment wherein said pulse generator generates at least one pulsed beat and a rest segment following said beat segment wherein said pulse generator discontinues generating said beat pulses;
a battery for powering said pulse generator;
a control module comprising a controller circuit operatively connected to said pulse generator to generate said pulsed beats during each said beat segment and discontinuing said pulsed beats during each said rest segment, wherein said controller circuit is configured to continue operation of said pulse generator over successive beat intervals repeated one after the other for a time period to emulate a heartbeat;
a sensor for detecting movement of the comfort product and generating sensor signals communicated to said control module in response to said movement, said sensor signals comprising beat signals generated upon detection of said pulsed beats by said pulse generator, rest signals during said rest segment which are lower than said beat signals, and movement signals different from said beat signals and rest signals in response to movement of said comfort product during said beat interval, said controller circuit continuing said pulsed beats during an extended time period upon each detection of said movement signals to continue generating heartbeats during movement of said heartbeat generator device by external movements generated by a user.

2. The heartbeat generator device according to claim 1 wherein said pulse generator comprises an intermittent motor and unbalanced weight to create a physical motion emulating a heartbeat, wherein said physical motion serves as said pulsed beat.

3. The heartbeat generator device according to claim 2, wherein said pulse generator generates at least two beat pulses during said beat segment of said beat interval emulating a heartbeat.

4. The heartbeat generator device according to claim 1, wherein said controller circuit discontinues said pulsed beats in the absence of movement signals transmitted during said time period to preserve battery power.

5. The heartbeat generator device according to claim 4, wherein said controller circuit continues said pulsed beat by extending said time period upon each detection of said movement signals.

6. The heartbeat generator device according to claim 4, wherein said controller circuit starts said pulse generator when stopped after detecting a said movement signal, and continues said pulsed beats by extending said time period upon each detection of said movement signals after starting of said pulse generator.

7. The heartbeat generator device according to claim 6, wherein said controller circuit discontinues said pulsed beats at the end of said time period when no movement is detected as indicated by the absence of said movement signals for a defined period.

8. The heartbeat generator device according to claim 1, wherein the controller circuit monitors said sensor signals including said beat signals and said rest signals over a plurality of said beat intervals and generates an average signal level for each of said beat segments and said rest segments to compensate for fluctuations in said beat signals and said rest signals.

9. The heartbeat generator device according to claim 8, wherein said controller circuit compares a magnitude of said sensor signals to differentiate said movement signals from said beat signals and said rest signals, wherein said movement signals are substantially greater than said beat signals and said rest signals.

10. The heartbeat generator device according to claim 1, which is provided in a plush comfort product for comforting a user by mimicking a heartbeat.

11. A heartbeat generator device for a comfort product, comprising:
a pulse generator for generating pulsed beats emulating a heartbeat during a beat interval, each said beat interval comprising an initial beat segment wherein said pulse generator generates at least one pulsed beat and a rest segment following said beat segment wherein said pulse generator discontinues generating said beat pulses;
a battery for powering said heartbeat generator device;
a control module comprising a controller circuit operatively connected to said pulse generator to generate said pulsed beats during each said beat segment and discontinuing said pulsed beats during each said rest segment, wherein said controller circuit is configured to continue operation of said pulse generator over successive beat intervals repeated one after the other for a time period;
a sensor for detecting movement of the comfort product and communicating sensor signals to said control module in response to said movement, said sensor signals comprising beat signals generated upon detection of said pulsed beats by said pulse generator, rest signals during said rest segment which are lower than said beat signals, and movement signals different from said beat signals and rest signals in response to movement of said comfort product during said beat interval, wherein said controller circuit monitors said sensor signals including said beat signals and said rest signals over a plurality of said beat intervals and generates an average signal level for each of said beat signals and said rest signals to compensate for fluctuations in said beat signals and said rest signals.

12. The heartbeat generator device according to claim 11, wherein said controller circuit compares a magnitude of said sensor signals to differentiate said movement signals from said beat signals and said rest signals, wherein said movement signals are substantially greater than said beat signals and said rest signals.

13. The heartbeat generator device according to claim 12, wherein said controller circuit discontinues said pulsed beats at the end of said time period when no movement is detected to increase battery longevity by allowing said heartbeat generator device to selectively shut off when it senses that a user is no longer interacting with said heartbeat generator device.

14. The heartbeat generator device according to claim 13, which is provided in a plush comfort product for comforting a user by emulating a heartbeat.

15. The heartbeat generator device according to claim 11, wherein said pulse generator comprises an intermittent motor and unbalanced weight to create a physical motion emulating a heartbeat, wherein said physical motion serves as said pulsed beat.

16. The heartbeat generator device according to claim 15, wherein said pulse generator generates at least two beat pulses during said beat segment of said beat interval mimicking a heartbeat.

17. The heartbeat generator device according to claim 11, wherein said controller circuit discontinues said pulsed beats in the absence of movement signals transmitted during said time period.

18. The heartbeat generator device according to claim 17, wherein said controller circuit continues said pulsed beat by extending said time period upon each detection of said movement signals.

19. The heartbeat generator device according to claim 11, wherein said controller circuit continues said pulsed beat by extending said time period upon each detection of said movement signals.

20. A heartbeat generator device for a comfort product, comprising:

a pulse generator for generating pulsed beats emulating a heartbeat during a beat interval, each said beat interval comprising an initial beat segment wherein said pulse generator generates at least one pulsed beat and a rest segment following said beat segment wherein said pulse generator discontinues generating said beat pulses;

a battery for powering said heartbeat generator device;

a control module comprising a controller circuit operatively connected to said pulse generator to generate said pulsed beats during each said beat segment and discontinuing said pulsed beats during each said rest segment, wherein said controller circuit is configured to continue operation of said pulse generator over successive beat intervals repeated one after the other for a time period;

a sensor for detecting movement of the comfort product and communicating sensor signals to said control module in response to said movement, said sensor signals comprising beat signals generated upon detection of said pulsed beats by said pulse generator, rest signals during said rest segment which are lower than said beat signals, and movement signals different from said beat signals and rest signals in response to movement of said comfort product during said beat interval, wherein said controller circuit monitors said sensor signals including said beat signals and said rest signals over a plurality of said beat intervals and generates an average signal level for each of said beat signals and said rest signals to compensate for fluctuations in said beat signals and said rest signals;

said controller circuit being configured to compare a magnitude of said sensor signals to differentiate said movement signals from said beat signals and said rest signals, wherein said movement signals are substantially greater than said beat signals and said rest signals, and said controller circuit being further configured to discontinue said pulsed beats at the end of said time period when no movement is detected to increase battery longevity by allowing said heartbeat generator device to selectively shut off when it senses that a user is no longer interacting with said heartbeat generator device, and configured to continue said pulsed beat by extending said time period upon each detection of said movement signals.

\* \* \* \* \*